United States Patent

Debry et al.

Patent Number: 6,097,498
Date of Patent: Aug. 1, 2000

[54] THIN LAYER PROTOCOL™ FOR PRINTER MANAGEMENT

[75] Inventors: Roger K. Debry, Longmont; Reinhard Heinrich Hohensee, Boulder; Harry Reese Lewis, Jr., Longmont; David Joseph Shields, Louisville; Frankie Sherwood Shook; David Earl Stone, both of Longmont, all of Colo.

[73] Assignee: International Business Machines Corporation, Armonk, N.Y.

[21] Appl. No.: 08/928,310

[22] Filed: Sep. 12, 1997

[51] Int. Cl.[7] .................................................. G06F 15/00
[52] U.S. Cl. .......................................... 358/1.13; 358/1.15
[58] Field of Search ..................................... 395/112, 116, 395/117, 114

[56] References Cited

U.S. PATENT DOCUMENTS

| | | | |
|---|---|---|---|
| 4,651,278 | 3/1987 | Herzog et al. | 395/117 |
| 5,504,928 | 4/1996 | Cook et al. | 395/500.48 |
| 5,559,933 | 9/1996 | Boswell | 395/114 |
| 5,592,683 | 1/1997 | Chen et al. | 382/309 |
| 5,652,711 | 7/1997 | Vennekens | 395/116 |

*Primary Examiner*—David K. Moore
*Assistant Examiner*—King Y. Poon
*Attorney, Agent, or Firm*—Robert Buckley

[57] ABSTRACT

A Thin Layer Protocol™ adds three new data stream commands—the WOCC, WOC and END commands—to the Intelligent Printer Data Stream™ ("IPDS™") structured page description language. The WOCC command creates a container for encapsulating a foreign print object, such as a PostScript™ or PCL™ command stream The container includes information identifying the type of object it contains. The WOC command provides the foreign print object data for the container and includes information defining the length of the object. The END command unambiguously locates the end of the container to prevent confusion of encapsulated binary data with escape sequences. Long objects are partitioned using separate WOC commands, each providing the length of its partition. The object type information enables the printer to easily invoke an appropriate language interpreter. Alternatively, the printer may use the object type and object length information to skip over an object which it does not recognize.

20 Claims, 7 Drawing Sheets

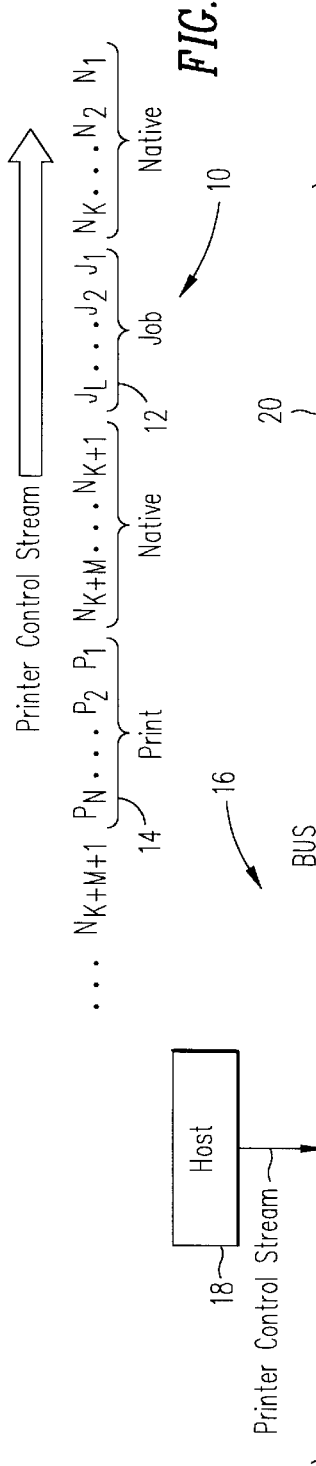

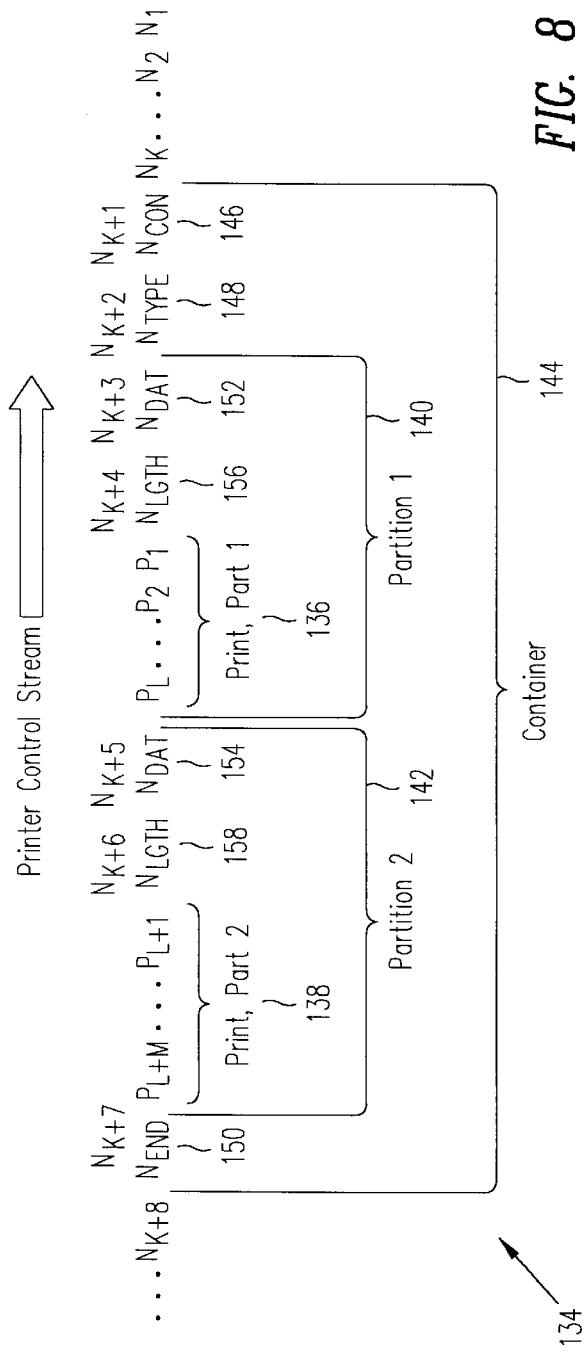

THIN LAYER PROTOCOL™ FOR PRINTER MANAGEMENT

BACKGROUND

1. Field of the Invention

This invention relates to the field of information processing and more specifically to processes for transmitting information between computers and printers.

2. Background of the Invention

U.S. Pat. No. 4,651,278, incorporated herein by reference, describes an interface process for an all points addressable printer. The process described in the '278 patent is known commercially as Intelligent Printer Data Stream (IPDS, a trademark of International Business Machines Corporation).

IPDS™ provides a structured field data stream that is designed to manage and control printer processes by allowing both data and commands to be passed to the printer using the data stream. This process enables the transmission of commands and data from a host application to the printer in a manner that is independent of the communication means and the transmission protocol. A description of the architecture of IPDS™ is provided in the manual *IPDS Reference Data Stream and Object Architectures,* S 544–3417, available from the International Business Machines Corporation.

Other commercially available printer page description and control languages are known, and several rely upon a printer control stream for communication between a computer and printer.

FIG. 1 illustrates an example of a known printer control stream in which job control information, $J_K \ldots$, is concatenated with printer control and page composition information, $P_1 P_2 \ldots P_L$. Typically, the printer control and page composition information is expressed in a common page description language such as PostScript™. To permit a printer to properly interpret the FIG. 1 printer control stream, the job control language includes a start string, $J_{START}$, which uniquely identifies the control string as being expressed in the job control language J. The job control language also includes a page description language identification command, $J_{LANGP}$, which is used to alert the printer that a page description language segment follows, expressed in the P page description language. The concatenated printer control and page composition segment is typically terminated with an escape sequence, $P_{ESC}$, which is recognizable by a printer language interpreter for the language P. Typically, another job control language string starting with a $J_{START}$ string will begin at this point in the concatenated printer control stream.

Though the printer control stream illustrated in the prior art FIG. 1 simplifies the communication task from the originating computer's point of view, the concatenated structure of such a stream requires the printer to perform complex pattern recognition (also known as "sniffing") to recognize the escape sequence at the end of the P language segment. The page composition segment can include graphics information segments containing binary data (not shown). Portions of the binary data are sometimes confused with a terminating escape sequence resulting in a loss of synchronization between the printer and the control stream. The loss of synchronization requires elaborate recovery procedures to reestablish synchronization.

In the example illustrated in FIG. 1, the printer is able to recognize three different page description languages. When a particular language is identified, $J_{LANGP}$, an appropriate one of the three language interpreters is activated. The task of recognizing the escape sequence which terminates the segment is assigned to the activated interpreter, which returns an END OF CURRENT STREAM DETECTED signal. A problem occurs when a printer does not include an interpreter for a specific page description language segment. The printer is unable to locate the end of the segment, and a loss of synchronization results.

It is desirable to have a simple process for communicating job control and page description information to a printer in a single printer control stream without requiring the printer to perform complex pattern recognition or risk loss of synchronization.

SUMMARY OF THE INVENTION

These goals are met by the present invention in which a "thin layer" of three simple commands are added to the IPDS™ language. These commands are used to create a container surrounding any object not expressed in the native IPDS™ page description language, as for example a segment expressed in the PostScript™ language. The container includes information which identifies the type of object it contains (e.g., the language in which the object is expressed) and the length of the object. This information permits the printer to easily activate an appropriate language interpreter, or to skip over a segment for which the printer does not include an appropriate interpreter. The printer simply counts its way to the end of the object without the need for complex pattern recognition to locate an escape sequence. Though the resulting page will not be exactly what that originator intended, the printer is able to remain synchronized with the printer control stream.

In a preferred embodiment, the IPDS™ language includes a WOCC command for creating an object container and providing the object type information, a WOC command for supplying the data contents of the container and the object length information, and an END command for terminating the object container.

In another preferred embodiment, a long object is broken into several parts and each part is provided using a separate WOC command having information which specifies the length of the part.

A separate container is used for each different object type. Thus a print job which includes job tracking information, a series of foreign print objects and embedded bit maps will include a container for the job tracking information, a different container for each foreign print object and embedded bit map. A printer which encounters an object it can't handle, simply skips over the container without loss of synchronization.

BRIEF DESCRIPTION OF THE DRAWINGS

For a further understanding of the objects, features and advantages of the Thin Layer Protocol™ for printer management, reference should be had to the following description of the preferred embodiment, taken in conjunction with the accompanying drawing, in which like parts are given like reference numerals and wherein:

FIG. 2 is a schematic diagram of a printer control stream according to one aspect of the present invention.

FIG. 3 is a block diagram showing a portion of a distributed computer system including printers for use with the printer control stream of FIG. 2.

FIG. 8 is a schematic diagram showing an example of the Thin Layer Protocol™ of FIG. 7 including a container partition.

FIG. 10 is a pseudocode listing illustrating a typical use of the WOCC, WOC and END commands.

DESCRIPTION OF THE PREFERRED EMBODIMENT

Figure 1:
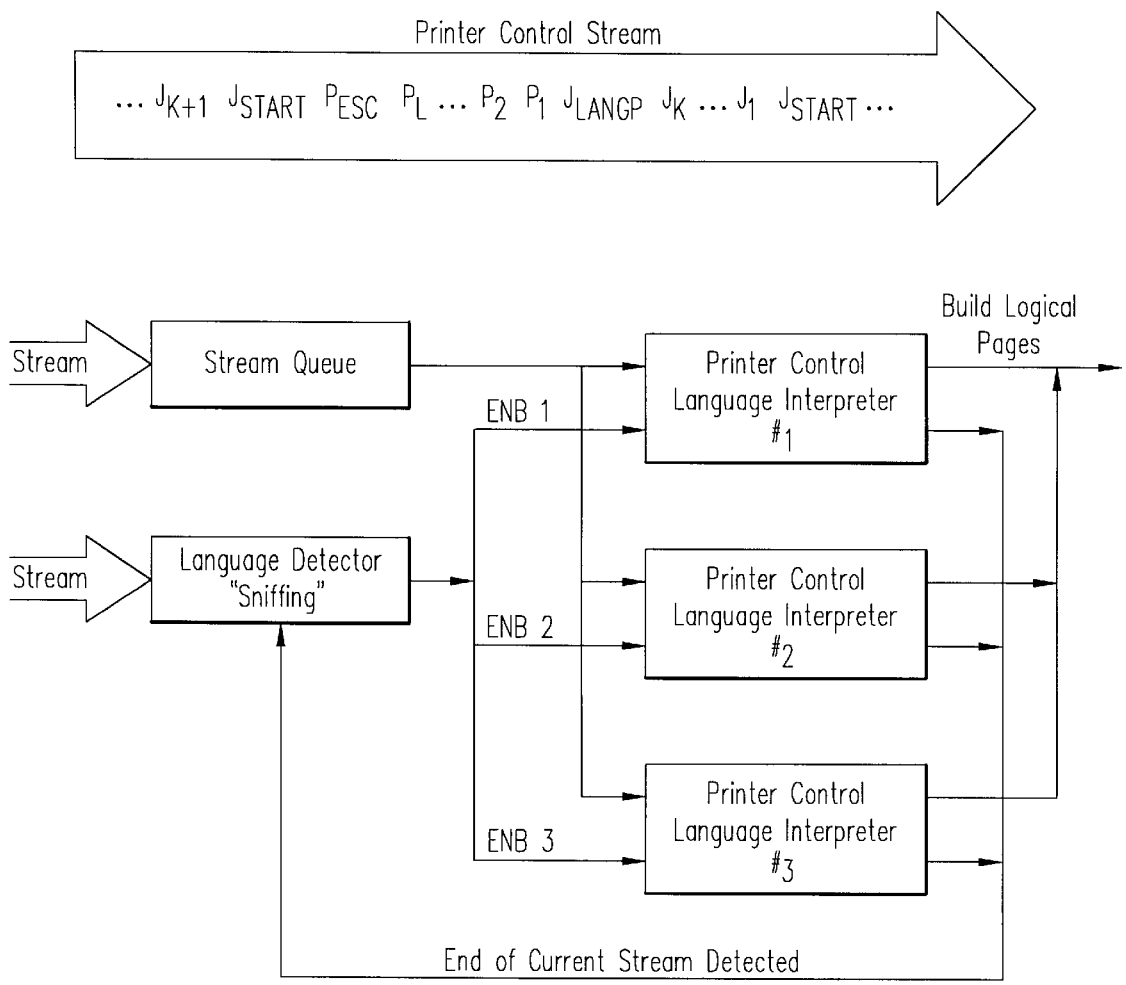
FIG. 1 is a block diagram illustrating a prior art protocol.

With respect to FIGS. 2–8, a series of embodiments of the invention are presented. The embodiments are of increasing complexity, beginning with the simplest and continuing through the most complex. Then, commencing with FIGS. 9A, 9B and 9C, embodiments of the invention as an addition to the existing Intelligent Printer Data Streams page description language are described. Finally, a distributed computer system using the augmented language is described.

A Printer Control Stream with Embedded Job Tracking Information

In its simplest embodiment, the present invention is a printer control stream expressed in a native page description language and including printer job-tracking information expressed in a standardized job control language which is independent of the native page description language. In other words, the standardized job control language has an internal structure and protocol which is not a subset of the native page description language.

The simple printer control stream (also "printer command stream", "command stream", or simply "stream") is illustrated in FIG. 2 and is designated generally by the numeral 10. The job-tracking information is designated by the numeral 12.

The native language elements of the control stream 10 are $N_1 N_2 \ldots N_K, N_{K+1} \ldots N_{K+M}, N_{K+M+} \ldots$, respectively. Each symbol of the control stream 10 represents a separate command to a printer for creating the contents of a portion of a printed page or group of pages. In a preferred embodiment, the commands are part of an Intelligent Printer Data Stream™ language such as defined in U.S. Pat. No. 4,651,278. The native language is a single, structured language for the control of printers connected to host computers, typically via a communications network.

The job-tracking information elements 12 are $J_1 J_2 \ldots J_L$, respectively, and are embedded within the native language control stream 10 without the use of native commands for identifying the beginning $J_1$ and the end $J_L$ of the job-tracking information 12. This simplicity of structure places upon the printer a need to examine ("sniff") each command of the control stream 10 to locate the start and the end of the embedded job-tracking information.

Generalizing to An Embedded Object

In a slightly more complex embodiment of the invention, the control stream 10 also includes an embedded print object 14 expressed in a foreign page description language, that is, a page description language that shares few or no common characteristics with the native language. Examples of typical foreign page description languages are PostScript™ and PCL™. The foreign print object information elements are $P_1 P_2 \ldots P_N$, respectively, and the foreign print object 14 defines the contents of a portion of a printed page, a full page, or a group of pages. Again, the foreign print object 14 is embedded within the native control stream 10 without the use of native commands for identifying the start $P_1$ and the end $P_N$ of the foreign print object. Thus the printer must examine each command of the control stream 10 in order to locate and handle the foreign print object 14, as in the case of the embedded job-tracking information 12.

A portion of a distributed computer system using the printer control stream 10 of FIG. 2 is illustrated in the block diagram of FIG. 3. The computer system is designated generally by the numeral 16 and includes a host computer 18, an interconnecting bus 20, a desktop printer 22, a controller 24, and a heavy-duty production printer 26.

In a typical system operation, the printer control stream 10 originates at the host computer 18 and is distributed to the printers across the bus 20. The control stream 10 carries commands forming individual print jobs, each addressed to a specific printer. A print job will typically include job-tracking information and print objects expressed in the native language, and may include print objects expressed in one or more foreign page description languages. The print objects are used to define the contents of anything from a portion of a printed page to an entire document.

A printer controller—for example the desktop printer 22, or alternatively, the controller 24—examines each command of the printer control stream 10 as it arrives via the bus 20. The controller interprets the native language commands, accepts print jobs addressed to the controller and rejects other print jobs, locates job-tracking information and foreign print objects and routes all information to appropriate destinations.

The controller is sometimes made a part of an individual printer, as in the case of the desktop printer 22. At other times the controller is a separate unit located within its own enclosure and connected to a free standing printer, as in the case of controller 24 and the production printer 26.

The "Sniffing" Problem

A controller which interprets the printer control stream 10 must examine every native command, looking for embedded job-tracking information 12 and for foreign print objects 14. The controller 22 includes a "sniffing" circuit 28 which examines the incoming printer control stream 10. The circuit 28 routes native language commands to a control circuit 30 which uses the commands to build logical pages 32 and to control a print engine 34. The concept of a "logical page" is fully described in U.S. Pat. Nos. 4,651,278 and 5,592,683 and will not be further described here. The disclosure of U.S. Pat. No. 5,592,683 is also incorporated herein by reference. When the circuit 28 locates the job-tracking information, $J_1 J_2 \ldots J_L$, respectively, it stores the information in a job MIB storage area 36. The circuit 28 must locate the start of the job-tracking information, must identify the stream commands $J_1 J_2 \ldots J_L$ as job-tracking information, and must locate the end of the job-tracking information in order to store the information in the job MIB storage area 36.

The controller 24 includes a "sniffing" circuit 38, a control circuit 40, a job MEB storage area 42, a logical page building function 44, and a pair of foreign page description language interpreters 46 and 48.

The controller 24 handles the native commands $N_I$ in the same manner as in the case of the desktop printer 22, routing the native command stream to the control circuit 40 for use in logical page building and printer control. The job-tracking information commands 12 are also handled in the same manner as in the case of the desktop printer 22, these commands are stored in the job MIB storage area 42. The initial commands of the foreign print object 14, however, must be carefully examined by the "sniffing" circuit 38 to determine the type of object and the page description language used to define the object. Once these matters have been determined, the "sniffing" circuit 38 activates an appropriate foreign language interpreter 46, 48 and routes the entire foreign language object 14 to the appropriate foreign language interpreter. In a typical example, one interpreter 46 is used to interpret the PostScript™ page description language, while the other interpreter 48 is used to interpret the PCL™ page description language. The output of the activated interpreter is typically used to form a portion of a printed page, or an entire page, or multiple pages by being added to one or more logical pages 44.

The resulting logical pages 44 are sent to the print engine of the production printer 26. Printer control commands which are not embedded within a print object, are instead commands within the native language control stream 10 and are interpreted by the control circuit 40 and sent directly via line 50 to the production printer 26 to control the printer.

In the embodiments which have been described above, the "sniffing" circuit 28, 38 has examined each command of the printer control stream 10 to identify job-tracking information 12 and foreign print objects 14. The "sniffing" circuit 28, 38 must locate the start of such an object, identify its type, its language, and locate its end. The "sniffing" circuit must route the native, job and foreign portions of the printer control stream 10 to appropriate destinations, and activate foreign language interpreters 46, 48. And when the printer/controller has no language interpreter corresponding to a foreign print object 14, the sniffing circuit 28, 38 is responsible for skipping over the object to maintain synchronization with the printer control stream 10.

The "sniffing" circuit accomplishes these tasks by relying upon pattern recognition, and must have available various patterns corresponding to the native page description language, the standard job-tracking information, and the foreign page description languages and escape sequences. These patterns are compared with the received stream commands 10 for carrying out these tasks.

Because printers are electromechanical devices operating under a variety of conditions, they sometimes jam, resulting in another type of loss of synchronization between the printer control stream 10 and the printer/controller 22, 24. The need to examine each command of the control stream in order to identify and to handle the embedded job-tracking information and the foreign print objects decreases the speed with which a re-synchronization can be accomplished.

Defining A "Protocol"

Figure 4:
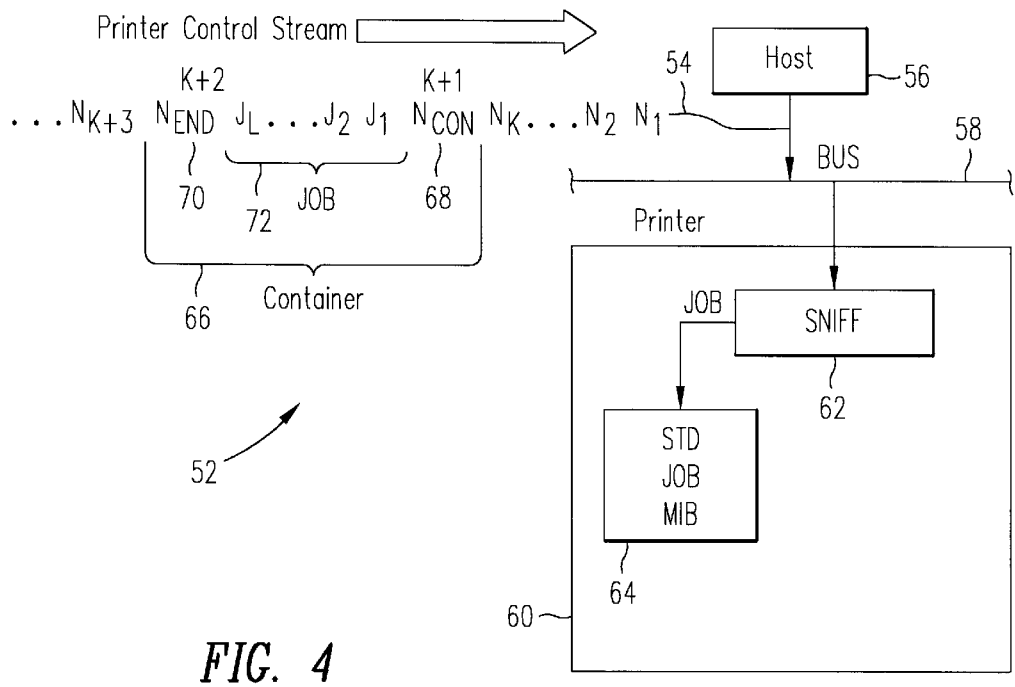
FIG. 4 is a schematic diagram illustrating a protocol for a printer control stream including an object-container.

The processes of skipping over unrecognized objects and recovering from error can be improved considerably by simplifying the "sniffing" process. FIG. 4 is a schematic diagram illustrating an embodiment of the invention which simplifies the tasks carried out by a "sniffing" circuit by encapsulating the job-tracking information and the foreign print objects in separate object-containers defined in the native page description language.

The embodiment of FIG. 4 is designated generally by the numeral 52, and includes a printer control stream 54, a host computer 56, a communications bus 58, and a printer 60. The printer 60 includes a "sniffing" circuit 62, and a job MIB storage area 64. The combination of the printer control stream 54 and the "sniffing" circuit 62 define a "protocol" in which the control stream includes commands $N_1$ $N_2$ ... $N_{CON}$ ... $N_{END}$, $N_{K+3}$ ..., expressed in a native page description language and job-tracking information $J_1$ $J_2$ ... $J_L$, expressed in a standardized job control language, independent of the native page description language.

Creating An Object-Container

The printer control stream 54 also includes an object-container 66 (also sometimes referred to as a "capsule") having a start command 68 and an end command 70, both commands defined in the native page description language. The object-container also includes a middle portion 72 located between the start command and the end command. The middle portion is used for carrying the job-tracking information $J_1$ $J_2$ ... $J_L$, or, alternatively, for carrying a foreign print object $P_1$ $P_2$ ... $P_N$ (FIG. 2).

The "protocol" is completed by the "sniffing" circuit 62 which recognizes the object-container start command 68, and is thus relieved of the task of comparing non-native language commands with stored patterns for finding the start of an object embedded in the printer control stream 54. The "sniffing" circuit 62 must still examine each command following the object-container start command 68 to locate the object-end command 70. However, since the object-end command is expressed in the native page description language, the complexity of the pattern recognition task is simplified. The "sniffing" circuit 62 must also examine the initial commands of the object it carries in an effort to determine the type of object and how it should be handled.

The combination of an expression of the native language and a parsing engine, in this case the "sniffing" circuit 62, defines a "protocol."

Defining Object Type

Figure 5:
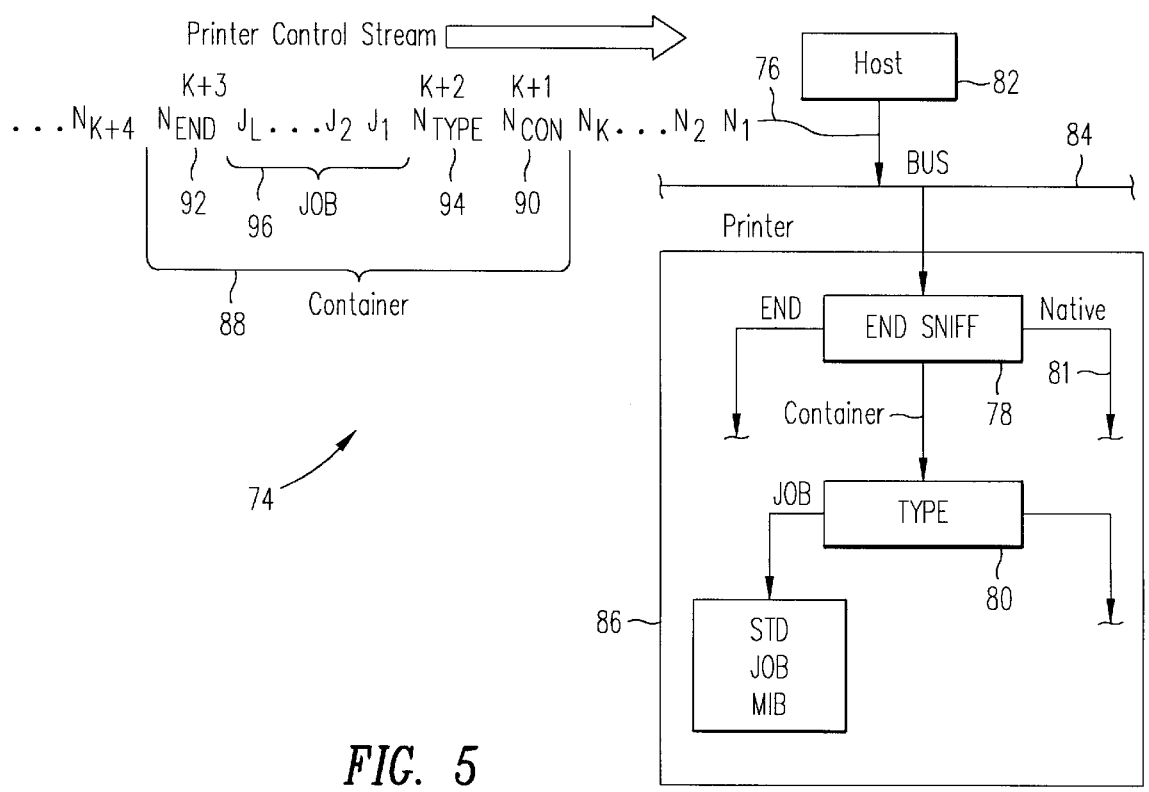
FIG. 5 is a schematic diagram illustrating the container protocol including an object-type field.

Further improvement in reliability and speed of error recovery is made in an embodiment illustrated in FIG. 5. In this embodiment of the invention, the object-container includes a command expressed in the native page description language for identifying the object type, for example, an object-container for carrying job-tracking information, or an object-container for carrying a foreign print object expressed in a particular foreign page description language. The "sniffing" circuit must still examine the commands of the object within the object-container to locate the end of the object, but no longer has to examine the initial commands of the object attempting to determine what it is and what language it is expressed in.

FIG. 5 is a schematic diagram illustrating a protocol having the desired characteristics. The protocol is designated generally by the numeral 74 and includes a printer control stream 76 and a parsing engine having a "sniffing" circuit 78 and an object-type identifying circuit 80. FIG. 5 also includes a host computer 82, a communications bus 84, and a printer 86 of which the "sniffing" circuit 78 and the object-type identifying circuit 80 form a part.

The printer control stream 76 includes an object-container 88 which begins with an object-container start command 90, and ends with an object-end command 92. The container 88 also includes an object-type command 94 which follows the object-container start command 90 and precedes the contained object, which in this illustration is job-tracking information 96. The object-container start command 90, the object-end command 92, and the object-type command 94 are all defined in the native page description language. The object-type command 94 permits the object-type identifying circuit 80 to determine the type of object carried within the container 88 without the need to carefully examine the initial commands of the object 96 in an effort to match the object's initial commands $J_1 J_2 J_3 \ldots$, etc., with stored patterns.

The object-container 88 is used to embed job-tracking information and, alternatively, foreign print objects within the native language printer control stream 76. The object-type command 94 includes information identifying the type of object carried within the object-container. The "sniffing" circuit 78 uses the information in the object-type command 94 to decide where to route the object and, in the case of a foreign print object (14, of FIG. 2), which foreign language interpreter to activate (46, 48 of FIG. 3).

The "sniffing" circuit 78 still needs to examine each command of the contained object 96, looking for the native language object-end command 92. When the "sniffing" circuit 78 finds the object-end command 92, it resumes looking for another object-container start command 90 and passes along the trailing native language commands $N_{K+4} \ldots$, for appropriate processing, 81.

Counting to find the End of an Object

The object-container can be improved in a different way by adding an object-length command defined in the native page description language. The object-length command defines the length of the object, preferably a count of the total number of bytes within the object. This next embodiment relieves the "sniffing" circuit of the need to examine each command of the embedded object in an effort to locate the end of the object. Now object-end locating becomes a counting problem instead of the more difficult pattern recognition problem.

Figure 6:
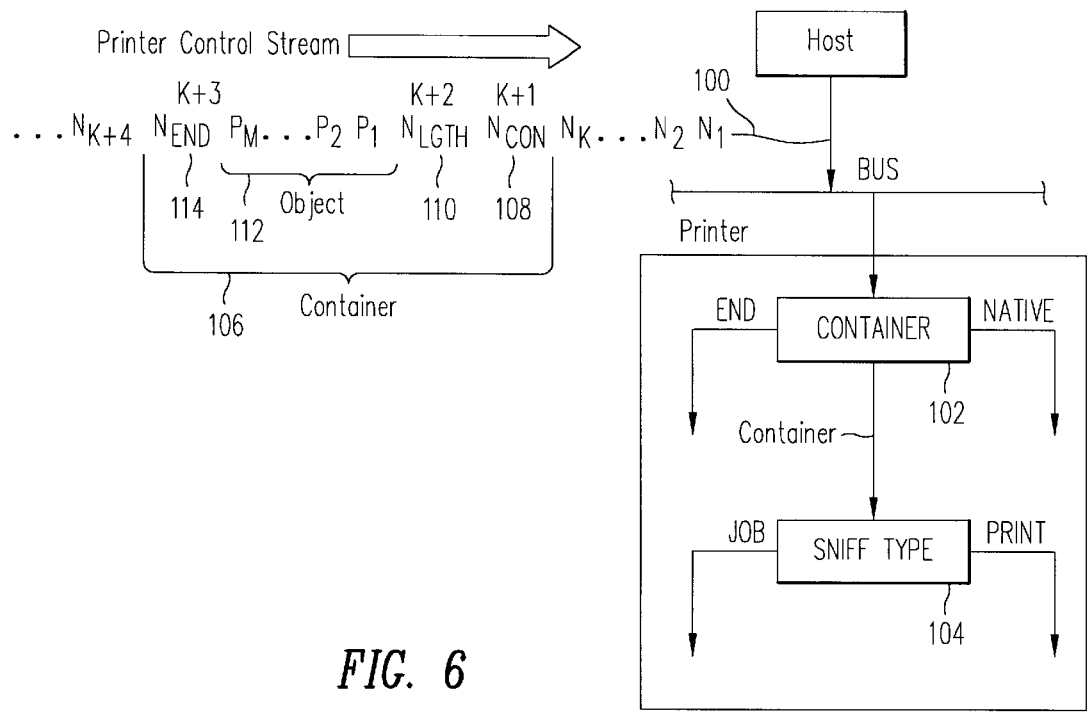
FIG. 6 is a schematic diagram illustrating the container protocol including an object-length field.

FIG. 6 is a schematic diagram which illustrates a protocol meeting this objective. The protocol includes a printer control stream 100 and a parsing engine including a container-recognizing circuit 102 and an object-type "sniffing" circuit 104—it is still necessary to examine the initial commands of the object to determine what type of object it is, and in the case of a foreign print object, what foreign page description language is used.

The printer control stream 100 includes an object-container 106 which begins with an object-container start command 108, is followed by an object-container length command 110, which is followed by the object 112, in this example the object is a foreign print object $P_1 P_2 \ldots P_N$, (see FIG. 2), and the container 106 ends with an object-container end command 114. The object-container start command 108, length command 110, and end command 114 are all defined in the native page description language. It is possible to implement this length-specified protocol without using the end command 114. The length command 110 provides a count of the number of bytes in the object 112. A counter can be used to locate the last command of the object without using the separate end command 114. In the preferred embodiment of this protocol, however, the end command is used.

Binary Objects: The Elimination of "Sniffing"

It is useful to combine both the object-type command and the object-length command with the object container. Doing so relieves the "sniffing" circuit of all its responsibilities— the object container tells you what type of object it contains and how large it is. The fact that "sniffing" is no longer required to determine type, length, or location of end means that you can put any digital information inside the object portion of the container. Thus you can encapsulate a binary object, for example a bit-map which forms part of a printed page, without concern that a "sniffing" circuit will confuse some portion of the binary object with an object of a different type. The ability to handle any binary object means that one can use this embodiment of the protocol to embed anything of a digitally encoded nature within the native language command stream.

Figure 7:
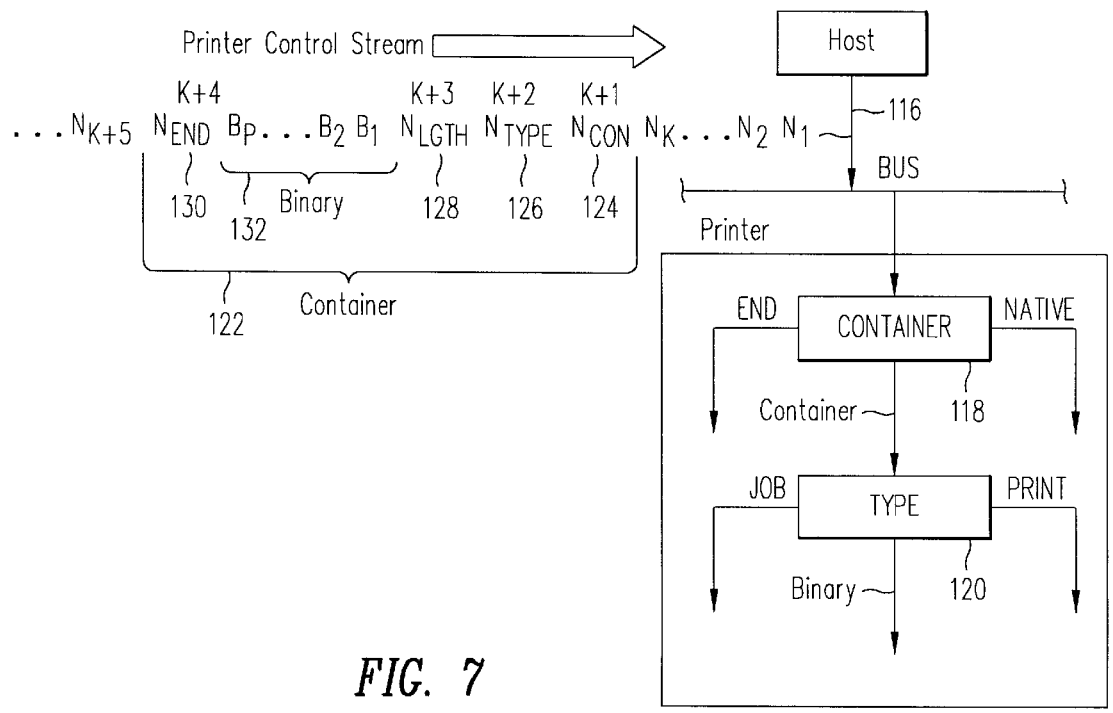
FIG. 7 is a schematic diagram illustrating a Thin Layer Protocol™ according to another aspect of the present invention.

FIG. 7 is a schematic diagram illustrating a protocol having an object container which in turn includes both an object-type command and an object-length command. The protocol includes a printer control stream expressed in the native page description language and designated by the numeral 116, and a parsing engine including an object-container recognizing circuit 118 and an object-type recognizing circuit 120.

The printer control stream 116 includes an object container 122. The object container 122 begins with an object-container start command 124, followed by an object-container type command 126, which is followed by an object-container length command 128. The object container 122 ends with an object-container end command 130. The object-container commands are defined in the native page description language. In an alternative embodiment, the type command 126 follows the length command 128. The object itself in this instance a binary print object 132 whose elements are $B_1 B_2 \ldots B_P$, follows the length command 128 and precedes the end command 130.

The tasks of the container recognizing circuit 118 are first, to identify the native language commands and to send those commands to an appropriate destination, and next, to recognize the object container 122 and to pass it to the object-type recognizing circuit 120, and finally to recognize the object end command 130 for alerting other parts of a printer/controller (not illustrated) that the native command stream will resume.

The tasks of the object-type recognizing circuit 120 are to examine the object-type command 126 and to direct the object to an appropriate destination. The contents of a job tracking information object, for example, are stored in a job MIB storage area (FIG. 4), while the contents of the binary object 132 are directed to a logical page building function (FIG. 3) where they become part of a printed page, as for example a bit map. Finally, the contents of a foreign language print object (FIGS. 2, 3) are directed to a logical page building function to define a portion of a printer page, an entire page, multiple pages or an entire document.

Breaking Large Objects into Parts

FIG. 8 is a schematic diagram illustrating a printer control stream 134 in which a lengthy foreign print object $P_1 P_2 \ldots P_{L+M}$, has been broken into two parts 136, 138 and each part has been placed into a separate partition 140, 142 and the partitions have been placed inside a single object container 144.

The object container 144 begins with an object-container start command 146, and is followed by an object-container type command 148. The object-container 144 ends with an object-container end command 150. Each partition 140, 142 begins with a partition start command 152, 154 which is followed by a partition length command 156, 158, respectively. All the commands 146–158 are defined in the native page description language.

In the preferred embodiment, the object-container end command 150 is placed at the end of the container following the last partition. No end commands are placed at the ends of the individual partitions. In an alternative embodiment, partition end commands are defined and one such command is placed at the end of each partition (not shown). Since an object length command is associated with each partition in the embodiment illustrated in FIG. 8, counting is used to locate the end of each partition. The object-container end command 150 is used by a parsing engine (not shown) to indicate that there are no more partitions.

In the preferred embodiment illustrated in FIG. 8, the object-container type command 148 defines the object type shared by all the partitions within the object-container 144. In an alternative embodiment (not shown) a separate object type command is placed inside each partition rather than preceding the first partition. This alternative format permits each partition to carry an object of a different type. In practice, the preferred embodiment illustrated in FIG. 8 has been shown to provide reliable operation and provides for easy recovery from printing errors such as paper jams. When objects of different types are to be embedded within the native language command stream, separate instances of the object-container 144 are employed, each containing its own object and object partitions.

A Thin Layer Protocol™

The Intelligent Printer Data Stream™ printer control language ("IPDS™") defined in U.S. Pat. No. 4,651,278 has been augmented to define an object container including object type and length information and permitting the partitioning of large objects. Three IPDS commands have been defined and added to the language for that purpose. A WOCC command is used to "open" an object container, and includes the object type information. A WOC command is used to "open" a partition, and includes the partition length information. An END command is used to "close" the object container. The augmented native language is referred to as "IPDS™ with Thin Layer" because only three commands are needed to add the object container to the existing native language. IPDS™ with Thin Layer continues the tradition established with IPDS™ as a single, structured, integrated page description and printer control language.

Figure 9A:
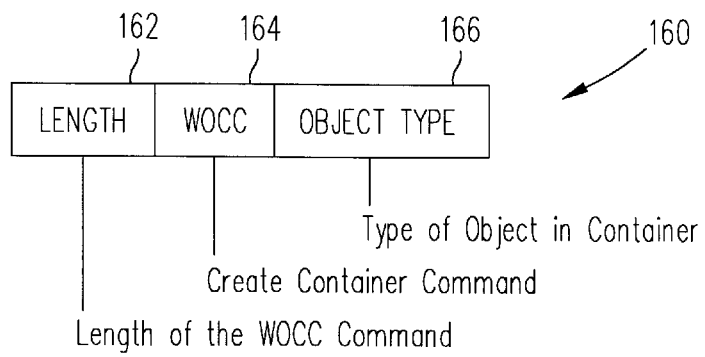
FIG. 9A is a schematic diagram illustrating an object-container start command, WOCC.
Figure 9B:
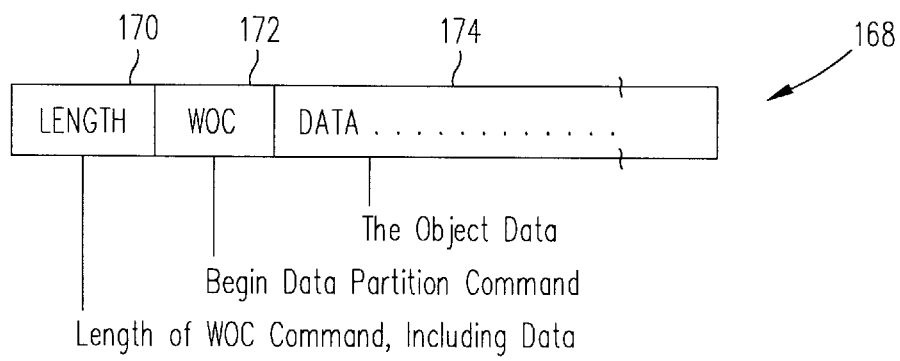
FIG. 9B is a schematic diagram illustrating an object-container partition start command, WOC.
Figure 9C:
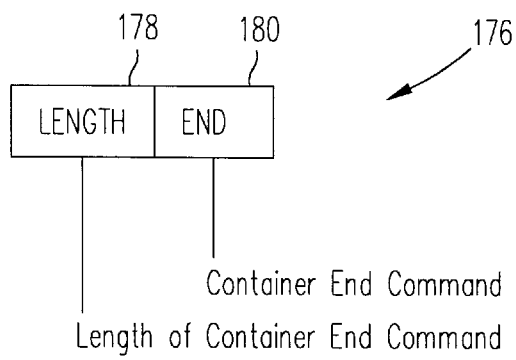
FIG. 9C is a schematic diagram illustrating an object-container end command, END.
Figure 11:
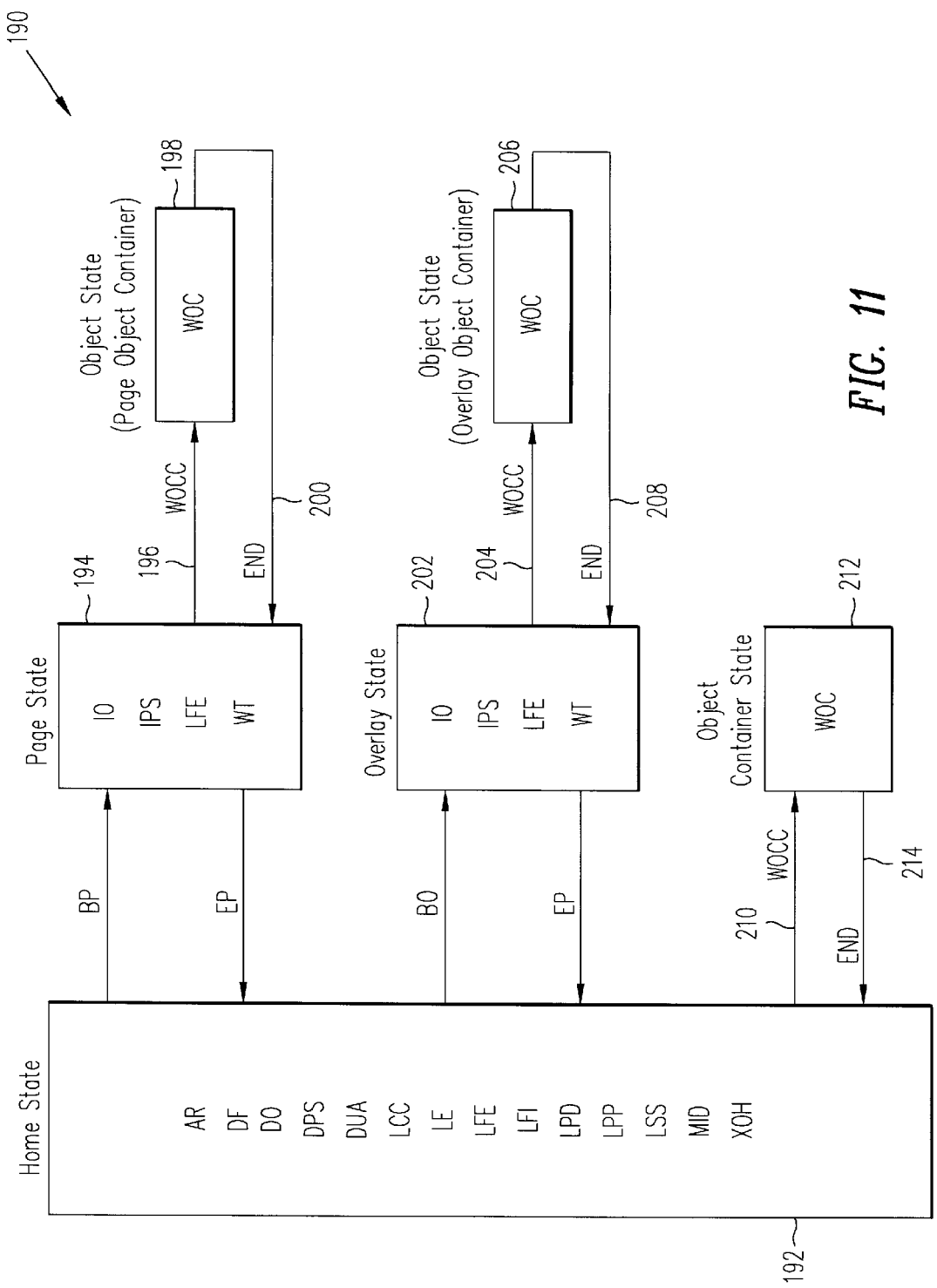
FIG. 11 is a state diagram of a finite state machine for parsing an Intelligent Printer Data Stream™ including a Thin Layer Protocol™ according to another aspect of the present invention.

FIGS. 9A, 9B and 9C are schematic diagrams which illustrate the format of each of the three Thin Layer commands, WOCC, WOC and END, respectively. FIG. 11 is a state diagram based upon FIG. 2 in U.S. Pat. No. 4,651,278. FIG. 11 illustrates the manner in which a parsing engine responds to each of the three Thin Layer commands.

We have been describing printer control stream commands as though they exist as a concatenation of separate entities, e.g., in FIG. 8, the object-container start command 146, the object-container type command 148, the partition start command 152, the partition length command 156, etc. In a preferred embodiment of IPDS™ with Thin Layer several of these commands are combined into a single IPDS command.

FIG. 9A is a schematic diagram illustrating an object-container start command combined with an object-container type command. The IPDS command is the WOCC "Write Object Container Control" and is designated generally by the numeral 160. The WOCC command 160 includes a command code 164, a command length code 162, and an object type code 166. The command code 164 identifies the specific IPDS command, WOCC. The command length code 162 precedes the command code 164, and is included for command format consistency within IPDS™ and indicates the length of the WOCC command. The object type code 166 indicates the type of object within the object container.

The WOCC command 160 is used to "open" an object container and to identify its contents.

FIG. 9B is a schematic diagram illustrating a partition start command combined with a partition length command. The IPDS command is the WOC "Write Object Container" and is designated generally by the numeral 168. The WOC command 168 includes a command code 172, a command length code 170, and data 174 which defines the object or the portion of the object within the partition. The command code 172 identifies the specific IPDS command, WOC. The command length code 170 is a sum of the length of fields 170, 172 plus the length of the data field 174, and thus provides a number which can be used to locate the end of the partition.

In an alternative embodiment of the WOC command (not illustrated) an object type field is included and repeats the object type code 166 contained in the WOCC command 160. This alternative embodiment permits the IPDS Thin Layer™ parsing engine to check for IPDS command format consistency.

The inclusion of the type code in the WOC command is used in a preferred embodiment to check the consistency of the WOC commands. The partitions of a single object container are sometimes supplied by different host computers. Thus it is useful to have some means to insure that the contents of the individual partitions, for example, different portions of a single printed page, are all of the same type. Doing so makes it possible to activate a single foreign language interpreter for all the parts of the single object— the printed page.

FIG. 9C is a schematic diagram illustrating an object-container END command, designated generally by the numeral 176 and used to "close" an IPDS™ Thin Layer object container. The END command informs the controller that no further partitions are included in the object container. The END command 176 includes a command code 180 and a command length code 178. The command length code 178 indicates the length of the END command and is included for IPDS command format consistency.

FIG. 10 is a pseudocode listing illustrating the manner in which the WOCC, WOC, and END commands are used in a typical example. The pseudocode includes a sequence of eight IPDS™ Thin Layer commands. Command (1) is a WOCC command which "opens" an object container, and the object type is identified as a job tracking data object". Command (2) is a WOC command which provides the job tracking data. Command (3) is an END command which "closes" the object container. Command (4) is a WOCC command which "opens" a second object container, and the object type is identified as a "PCL™ data object". Commands (5), (6) and (7) are WOC commands, each providing part of the PCL™ data object. The length code (170 of FIG. 9B) for each WOC command includes the amount of PCL™ data within the specific WOC command (partition). Finally, command (8) is an END command which "closes" the second object container. Note that two object containers are required for this transaction. The first to carry the job tracking data, the second to carry the PCL™ data.

FIG. 11 is a state diagram of a finite state machine ("FSM") representing the behavior of a parsing engine as it encounters Thin Layer commands within an IPDS™ printer control stream. The figure is a modification of the FIG. 2 in U.S. Pat. No. 4,651,278. The added features are line 196, box 198, line 200, line 204, box 206, line 208, line 210, box 212 and line 214. The original FIG. 2 is explained fully in the '278 patent. The Home State 192 corresponds to the Home State 21 of FIG. 2 of the '278 patent. The Page State 194 and the Overlay State 202 correspond respectively to the Page State 22 and the Overlay State 37 of FIG. 2 of the '278 patent. The Object States 198 and 206, and the Object Container State 212 are new.

Our purpose here is to describe the modifications to this state diagram resulting from the addition of the Thin Layer commands, WOCC, WOC and END, to the native IPDS™ page description language.

Building A Logical Page

As stated above, the concept of a "logical page" is developed in U.S. Pat. Nos. 4,651,278 and 5,592,683, the disclosures of both of which are incorporated by reference, and will not be further described here. The FSM representing the parsing engine is designated generally by the numeral 190 and will be referred to hereafter as the parsing engine 190.

Once the state of the parsing engine 190 has been advanced to the Page State 194, the parsing engine is responsive to the arrival within the command stream of a WOCC command, "opening" an object container. The arrival of the WOCC command 196 causes the parsing engine to enter the WOC object state 198 where it awaits the arrival of WOC commands and provides their contents to the logical page building process. When the object type is a foreign page description language, the contents of each WOC command are "interpreted" by an appropriate foreign language interpreter (e.g., interpreter 46 of FIG. 3). The arrival of an END command 200 causes the parsing engine to return to the page state 194. While in this 194, 198 state loop, the contents of the arriving object containers and their partitions will become parts of logical pages.

Building An Overlay

The Thin Layer object container is also used to provide portions of an overlay (see U.S. Pat. No. 4,651,278 for a discussion of an "overlay"). The 202, 206 state loop is used for that purpose. Once advanced to the overlay state 202, the parsing engine is responsive to the arrival of a Thin Layer WOCC command, opening an object container for a print object which will become part of an overlay. When the WOCC command 204 is received, the parsing engine advances to the WOC state 206 and awaits the arrival of one or more WOC commands, each providing part of the print object. When the contents of the print object are expressed in a foreign language, the parsing engine 190 invokes an appropriate interpreter to convert the foreign page description commands to a printer compatible form. The details of such conversion are outside the scope of the present invention. This behavior continues until the END command is received, closing the object container and returning the parsing engine to the overlay state 202.

A General Purpose Object Container State

An object container can be used without being part of a logical page or an overlay. This situation arises when printing a document completely composed of a non-IPDS page description language, such as PostScript™. In this situation the parsing engine is between jobs and waiting in home state 192. This will be the situation when job tracking information for the non-IPDS print job is about to arrive. The job tracking information will arrive inside an object container and will preceed the actual print data (see the pseudo-code illustrated in FIG. 10). The arrival of a WOCC command 210 will move the parsing engine into an object container state 212 where it will await the arrival of one or more WOC commands carrying the job tracking information. The job tracking information will be stored in an appropriate job MIB storage area (e.g., 42 of FIG. 3). When the END command 214 is received, the parsing engine 190 will revert to the home state 192.

The next WOCC command to arrive in this case will again move the parsing engine to WOCC state and identify the following data as a non-IPDS page description language, such as PostScript™. The parsing engine will then await the arrival of one of more WOC commands carrying the PostScript data. The PostScript data will be sent to a PostScript interpreter where the output pages are built. When the END command 214 is received, the parsing engine 190 will revert to the home state 192.

System

When used in a distributed computer system, for example an office network having network printers available to a multitude of network host computers, IPDS™ permits individual hosts to prepare portions of printed documents each using a preferred page description language. Thus one host may prepare and transmit a print object in the PostScript™ language. That print object is encapsulated by the host in a Thin Layer object container and transmitted to a printer. Another host may prepare a binary object for insertion into a document prepared by yet another host. The host creating the binary object encapsulates the object in a Thin Layer object container and sends it to the other host for incorporation into the completed document.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following claims.

We claim:

1. A thin layer protocol for printer management, comprising:

a native language printer control stream;

the printer control stream defining an object-container for recoverable transfer of foreign language objects within the control stream;

a parsing engine receiving the control stream;

the parsing engine responsive to the object-container for appropriately handling the foreign language objects outside native stream handling; and the thin layer including a first command for creating an instance of the object-container, a second command for building an object for insertion into the object-container, and a third command for terminating the object-container.

2. The thin layer protocol of claim 1, wherein the first command includes an object-type field for identifying the type of foreign language object within the container.

3. The thin layer protocol of claim 2, wherein the parsing engine is responsive to the object-type field for invoking an interpreter for the foreign language in which the object is expressed.

4. The thin layer protocol of claim 1, wherein the second command includes an object-length field for identifying the length of the foreign language object.

5. The thin layer protocol of claim 1, wherein the foreign language object is partitioned, the object-container including a sequence of the partitions, and each partition is preceded by an instance of the second command.

6. The thin layer protocol of claim 5, wherein the instance of the second command preceding each partition includes an object-length identifier defining the length of the partition.

7. The thin layer protocol of claim 1, wherein the parsing engine includes first, second and third states, and the engine occupies the first state when no printer control stream is present and within an instance of the printer control stream and outside an object-container, enters the second state upon encountering an instance of the first command and entering an object-container, and enters the third state upon encountering an instance of the second command, and remains in the third state until encountering an instance of the third command or, alternatively, a time-out, which ever occurs first.

8. A printer control stream expressed in a native page description language and including job-tracking information expressed in a standardized job control language independent of the native page description language, and the native page description language defining a control stream object-container having a start, an end, and a middle portion located between the start and the end for carrying one of the job-tracking information and the foreign print object.

9. The printer control stream of claim 8, wherein the object-container includes an object-type field, expressed in the native language, for identifying the type of object within the container.

10. The printer control stream of claim 9, wherein the object-type identifies the job-tracking information and the middle portion carries the job-tracking information.

11. The printer control stream of claim 9, wherein the object-type identifies a foreign print object and the middle portion carries the foreign print object.

12. The printer control stream of claim 8, wherein the object-container includes an object-length field, expressed in the native language, for locating the end of the container.

13. The printer control stream of claim 12, wherein the object-container further includes an object-type field, expressed in the native language, for identifying the type of object within the container.

14. The printer control stream of claim 13, wherein the object-type field identifies a binary object and the middle portion carries a binary object.

15. The printer control stream of claim 14, wherein the binary object is a bit-map defining a portion of a printed page.

16. The printer control stream of claim 8, wherein the middle portion carries a plurality of objects of the same object-type.

17. The printer control stream of claim 16, wherein the container defines an outer-container, and further including an inner-container, defined in the native language, for carrying an object, the middle portion of the outer container carrying one or more instances of the inner-container, and each instance of the inner-container carrying an object of the same type.

18. The printer control stream of claim 17, wherein the outer-container includes an object-type field, defined in the native language, for identifying the type of object carried by each instance of the inner-container.

19. The printer control stream of claim 18, wherein each inner-container includes a start and an object-length field, both defined in the native language, and the object-length field defining the length of the object carried by the inner-container.

20. The printer control stream of claim 19, wherein a single object is partitioned between a plurality of inner-containers and the length-field of each inner-container defines the length of the partition carried by the inner-container.

* * * * *